Figure 1:
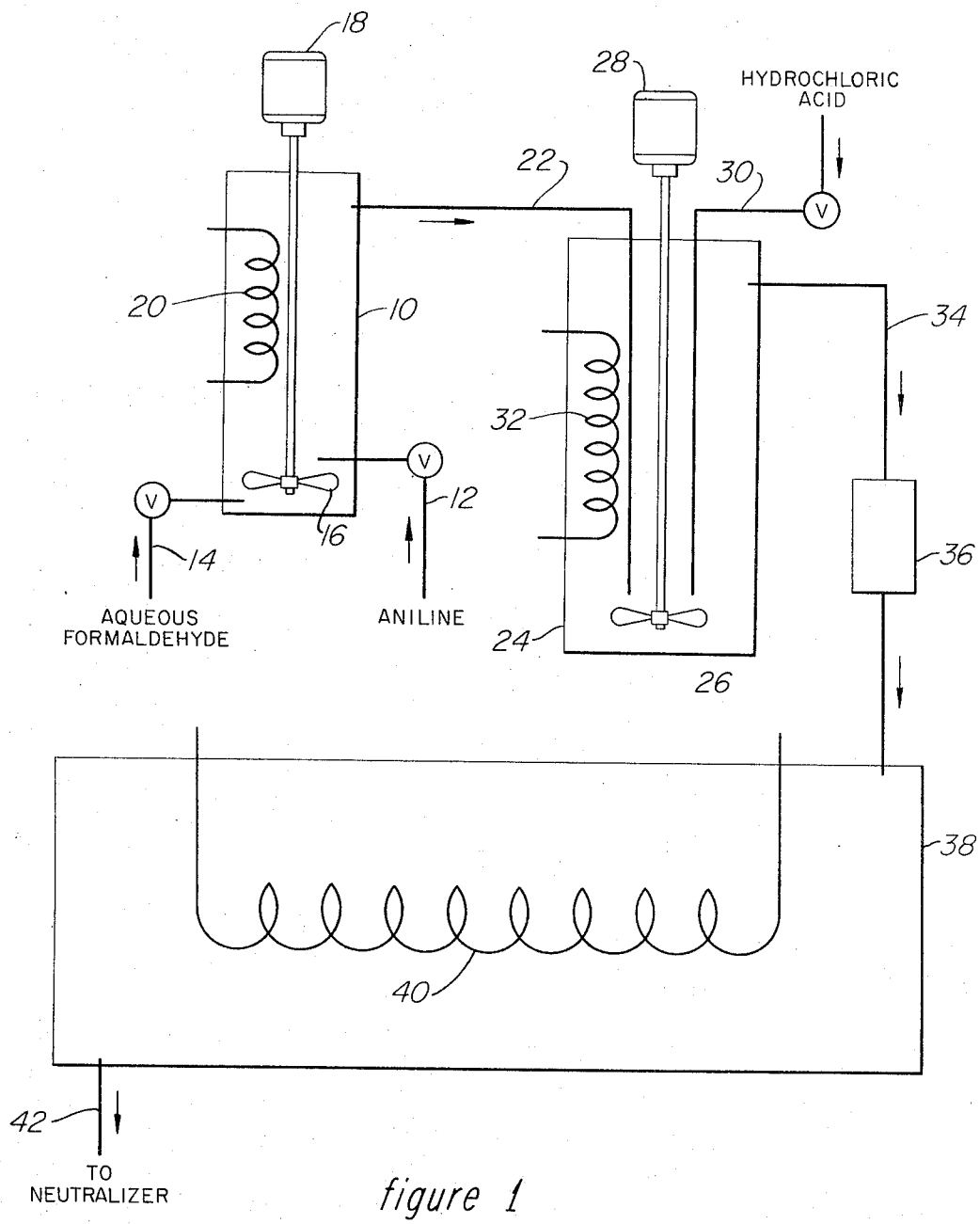

United States Patent Office 3,297,759
Patented Jan. 10, 1967

3,297,759
CONTINUOUS PROCESS FOR PRODUCING MIXTURES OF METHYLENE-BRIDGED POLYPHENYL POLYAMINES
John N. Curtiss, Baytown, and Clarence N. Forsvall, Jr., Pasadena, Tex., and Karl W. Rausch, Jr., Hamden, Conn., assignors to The Upjohn Company, Kalamazoo, Mich., a corporation of Delaware
Filed Jan. 13, 1964, Ser. No. 337,475
9 Claims. (Cl. 260—570)

This invention relates to a novel process for producing organic compounds. In particular, this invention relates to a novel continuous process for producing mixtures of methylene-bridged polyphenyl polyamines.

The novel continuous process of this invention comprises the steps, (1) continuously passing aniline and aqueous formaldehyde solution in an aniline-formaldehyde molecular ratio about 4:1 to about 4:2.5 into a first mixing zone maintained at an elevated temperature, (2) continuously passing the stream emerging from said first mixing zone into a second mixing zone maintained in the range about 70° to about 100° C., and there continuously mixing said stream with at least enough hydrochloric acid to provide an HCl-aniline molecular ratio about 1:4 based on the amount of aniline initially present in the stream, (3) maintaining the stream emerging from said second mixing zone at an elevated temperature until a substantial amount of a mixture of methylene-bridged polyphenyl polyamines has formed, and (4) recovering said mixture of methylene-bridged polyphenyl polyamines.

Mixtures of methylene-bridged polyphenyl polyamines similar to those produced by the novel continuous process of this invention are known in the art. These prior art mixtures have been produced by batch-type processes which involve mixing aqueous formaldehyde solutions with mixtures of aniline and hydrochloric acid [e.g., Wagner, J. Am. Chem. Soc. 56, 1944–6 (1934); U.S. Patent 2,950,263; German Specification 1,131,877] or which involve mixing aniline with mixtures of hydrochloric acid and aqueous formaldehyde solution [e.g., U.S. Patent 2,683,730].

Mixtures of methylene-bridged polyphenyl polyamines produced by the novel continuous process of this invention can be transformed by phosgenation to corresponding mixtures of methylene-bridged polyphenyl polyisocyanates. The latter mixtures are useful as reactants in the production of polyurethane foams [e.g., U.S. Patents 2,990,379; 3,018,256; 3,072,582; 3,075,930].

It is thought that at least one of the isomeric forms or ar,ar'-methylenedianiline and at least one of the isomeric forms of $\alpha,\alpha$-(aminophenylene)ditoluidine are present in each mixture produced according to this invention. Structures of the other polyamine components are not known.

According to the prior art, the composition of a particular methylene-bridged polyphenyl polyamine mixture depends upon the relative amounts of aniline and formaldehyde used to produce it. For example, it has been reported that polyamine mixtures containing 15, 28, 40, and 85 percent ar,ar'-methylenedianilines are produced by reacting aniline and formaldehyde in the molecular ratios 4:3.5, 4:3.1, 4:2.5, and 4:1, respectively [U.S. Patents 2,683,730 and 2,950,263]. In each instance, it was apparently assumed that the remainder of the polyamine mixture consisted of triamines and higher polyamines. No investigations of the influence of other process factors on polyamine mixture compositions have been reported.

We have now made the surprising and unexpected discovery that the prior art batch-type procedures for producing mixtures of methylene-bridged polyphenyl polyamines are not easily adaptable to continuous procedures. For example, resinous solids tend to be formed when an aqueous formaldehyde solution is combined with a mixture of aniline and hydrochloric acid, or when aniline is combined with a mixture of hydrochloric acid and aqueous formaldehyde solution. These resinous solids interrupt the continuous process by plugging reactant inlets and coating inner walls of reaction chambers. In the prior art batch procedures, the resinous solids cause little if any inconvenience during operations in the relatively large batch reaction vessels.

We have also made the surprising and unexpected discovery that useful mixtures of methylene-bridged polyphenyl polyamines can be prepared rapidly, efficiently, continuously, and economically by mixing streams of aniline and aqueous formaldehyde solution at an elevated temperature and in a critical aniline-formaldehyde molecular ratio range, and subsequently mixing the resulting aniline-formaldehyde water stream with hydrochloric acid within a relatively narrow and critical temperature range and in a critical HCl-aniline molecular ratio range. It is thought that aniline and formaldehyde react with each other in the absence of hydrochloric acid. The opportunity provided for this preliminary reaction before hydrochloric acid comes into the reaction stream is thought to be a significant factor in the success of our novel continuous process. After the hydrochloric acid is thoroughly mixed into the reaction stream, temperature control becomes less important, and the formation of the desired mixture of polyamines is completed by maintaining the reaction mixture at an elevated temperature, either in stream form or after deposit in one or more holding tanks.

When the desired reaction is complete, part of the polyamine mixture will be present as a mixture of hydrochloric acid addition salts. Continuous neutralization with a base changes the polyamine stream completely to the free base form. Purification in a continuous manner can be accomplished by modifications of the prior art batch purification methods. Alternatively, the final stream can be collected in tanks, neutralization and purification of the desired polyamine mixture then being carried out at intervals by prior art batch procedures.

The novel continuous process of the invention can be used to prepare methylene-bridged polyphenyl polyamine mixtures with a wide composition range. In discussing this point, it is convenient to differentiate among these various mixtures in terms of the diamine, i.e., ar,ar'-methylenedianiline, content. The initial aniline-formaldehyde molecular ratio can vary from about 4:1 to about 4:2.5. A diamine content about 85% can be obtained by using the ratio 4:1. A diamine content about 40% can be obtained by using the ratio 4:2.5. In each instance, the remainder of the mixture consists of polyamines of higher molecular weight. The crude polyamine mixtures also initially contain varying amounts of aniline which can readily be removed by distillation. As in the prior art batch processes, an increase in the amount of formaldehyde relative to the amount of aniline usually causes a decrease in the diamine content and an increase in the higher polyamine content of the product. We have discovered, however, that there are other factors which influence the composition of a polyamine product prepared by the novel continuous process of this invention. Especially important among those factors are temperature control in the mixing zones and the HCl-aniline molecular ratio.

Aniline and aqueous formaldehyde solutions are mixed in the first mixing zone at an elevated temperature. The particular temperature used is not critical. In order to obtain a uniform final product relatively free of resinous, high molecular weight solids, however, it is preferred that the temperature of the entire first mixing zone be maintained within about a 5° C. range, the particular range being chosen according to other process and product factors. As the first zone temperature is increased, the rate of the preliminary reaction between aniline and formaldehyde increases, and the diamine content of the final reaction mixture gradually decreases with a corresponding increase in higher polyamine content and in unreacted aniline. A first zone reaction temperature above about 100° C. is ordinarily neither necessary nor desirable because the final polyamine product is then likely to have such a low diamine content and such a high viscosity as to be of little value for the preferred application, i.e., transformation by phosgenation to a useful mixture of polyisocyanates. Moreover, the reaction stream begins to boil near 100° C. and it would be necessary to maintain the first zone under super-atmospheric pressure to attain a substantially higher zone temperature. First zone temperatures as low as about 40° C. are practical. Particularly satisfactory results are usually obtained using first zone temperatures in the range about 70° to about 100° C.

The necessary residence of the stream of aniline, formaldehyde, and water in the first mixing zone is dependent on the design and temperature of the zone. In the range about 70° to about 100° C., at least a 30-second residence is usually preferred, although this can be reduced by particularly rapid and thorough zone mixing. At lower first zone temperatures, a longer residence, for example, up to about 5 minutes, is desirable. Longer residence in the first zone is usually not necessary and will decrease the production rate for any particular stream.

The concentration of the aqueous formaldehyde solution added to the first mixing zone is not critical. It is advantageous to use the commercially available 37% solution although a more or less concentrated solution can be used.

The stream emerging from the first mixing zone is usually a white to light-colored liquid emulsion. It is preferred that the individual phases in this stream not be allowed to separate before hydrochloric acid is added.

It is important that sufficient hydrochloric acid be added to the stream in the second mixing zone so that the average HCl-aniline molecular ratio in the stream is at least 1:4 based on the amount of aniline initially present in the stream, i.e., when the aniline first contacts the formaldehyde and water. In other words, at least one mole of hydrochloric acid should be added to each stream portion which originally contained 4 moles of aniline. When a lesser relative amount of HCl is used, there is a tendency toward the production of a different type of polyamine mixture in which there are fewer primary amino moieties, e.g., that described by Frey, Helv. Chim. Acta 18, 496–7 (1935). Production of this latter type of polyamine mixture is not within the scope of this invention. As the relative amount of HCl in the second mixing zone is increased, the percentage of diamine in the final polyamine product mixture at first increases with a corresponding decrease in the higher molecular weight polyamine content. Unexpectedly, however, it was discovered that there is relatively little change in the diamine content of the final reaction stream when more hydrochloric acid is used than would correspond to an average HCl-aniline molecular ratio about 3:4. Therefore, there is usually no reason to use a larger proportion of hydrochloric acid and, indeed, there is actually disadvantage in using more acid because of the increased difficulty in temperature control within the second mixing zone, increased expense for the additional hydrochloric acid, and increased inconvenience and expense in later neutralizing the excessive amounts of HCl in the final stream. If it is desired that the final product have a particularly high diamine content, it is preferred to accomplish this by control of the aniline-formaldehyde ratio or the mixing zone temperatures. Preferably, the average HCl-aniline molecular ratio in the stream should be no greater than 2.5:4.

Other acids than hydrochloric acid can be used in transforming aniline and formaldehyde to a mixture of methylene-bridged polyphenyl polyamines but there is usually no reason to use them. In particular, use of sulfuric acid tends to cause precipitation of polyamine sulfuric acid addition salts which unduly complicate the isolation and purification stages.

The concentration of HCl in the hydrochloric acid added to the second mixing zone is not critical, and any of the normally commercially available concentrations can be used, for example, 16°, 18°, 20°, or 22° Bé. There is usually no reason to use more or less concentrated hydrochloric acid than one of these.

Temperature control in the second mixing zone during addition of hydrochloric acid is the most critical factor in the novel continuous process of this invention. A second mixing zone temperature about 70° to about 100° C. is preferred. At temperatures lower than about 70° C., the rate of production of the desired polyamine mixture is inconveniently slow. As the temperature in the second mixing zone is increased, the diamine content in the final product decreases and the amount of higher molecular weight polyamines increases with a corresponding increase in product viscosity. At temperatures above about 100° C., the final polyamine product is likely to have an undesirably low diamine content and high viscosity.

The formation of amine-HCl addition salts which occurs when the basic amine components of the stream contact hydrochloric acid is highly exothermic, and efficient mixing and heat transfer are necessary to avoid "hot spots" or areas of unduly high temperature within the second mixing zone. Substantial amounts of undesirable resinous materials of high molecular weight tend to form in such areas. It is preferred that whatever mixing zone temperature is chosen within the range about 70° to about 100° C. be maintained with a variation corresponding to a range no greater than about 5° C. Otherwise, the final product will not have a uniform or desirable composition.

It is usually preferred that the average residence of the stream in the second mixing zone be at least one minute, preferably about one to about 20 minutes, to ensure complete mixing and heat exchange. However, as will be apparent to those skilled in the art, the optimum residence will depend on the design of the mixing zone, and a lesser residence is feasible. An important criterion is that the highly exothermic amine-HCl addition salt formation be substantially complete before the stream emerges from the second mixing zone.

Vigorous mixing is usually not necessary after the stream emerges from the second mixing zone. It is desirable, however, to maintain this stream at an elevated temperature, preferably in the range about 50° to about 100° C., until the desired polyamine mixture has been formed. Any conventional means may be used to accomplish this. For example, the stream may be allowed to pass through a long heated pipe, or it may be allowed to accumulate in a series of relatively small, heated hold tanks or a single relatively large, heated hold tank with internal baffles so that all portions of the stream are subjected for a uniform period of time to the elevated temperature. The time required for this final heating stage will vary, being dependent on such factors as the holding temperature, the relative amounts of aniline, formaldehyde, HCl, and water which have been placed in the stream, the temperatures of the two mixing zones, and the residence of the stream in said zones. A hold time of about one to about 5 hours at about 80° to about 90° C. is usually satisfactory. As will be apparent to those skilled in the art, the optimum hold time for each combination of conditions must be determined by experiment.

It has been observed that the stream emerging from the second mixing zone is usually in the form of an orange slurry which flows readily and which gradually changes to a clear dark orange solution during the hold period. The tractable nature of this orange slurry is completely unexpected in view of the intractable resinous nature of the initial solids which tend to be formed when aniline, hydrochloric acid, and aqueous formaldehyde solution are mixed according to one of the prior art batch-type procedures.

The desired mixture of methylene-bridged polyphenyl polyamines can be isolated in a continuous manner from the final stream by conventional methods, and can be purified in a continuous manner also by conventional methods. It is unexpectedly advantageous, however, to merge the stream emerging from the holding means with a fresh stream of aniline to reduce the stream viscosity. The isolation procedure is thereby facilitated. Because part of the aniline and polyamines is present in the final stream as a mixture of hydrochloric acid addition salts, the stream should then be neutralized. It is preferred that the stream be brought to about pH 9 to 10 with a base, e.g., a 50% aqueous sodium hydroxide solution, and that the stream temperature not rise above about 100° C. during addition of the base. Other conventional bases than sodium hydroxide can be used for this purpose. Examples are potassium hydroxide and calcium hydroxide. The mixture of aniline and polyamine can then be separated from the basic aqueous layer. Most of the aniline is separated from the polyamine mixture by conventional fractional distillation at reduced pressure, the last traces of aniline being removed by passing a stream of nitrogen through the polyamine mixture.

It has been observed that contact of the process stream with oxygen or air at any stage produces a darker final polyamine mixture. If a light-colored product is desired, for example, for transformation to relatively light colored polyurethane foams via the corresponding mixture of polyisocyanates, it is preferred to carry out the continuous process with substantially full lines, mixing zones, and hold tanks, or to purge air from the apparatus system with a stream of an inert gas, for example, nitrogen or helium, and to maintain a positive pressure of said inert gas in the system.

Figure 2:
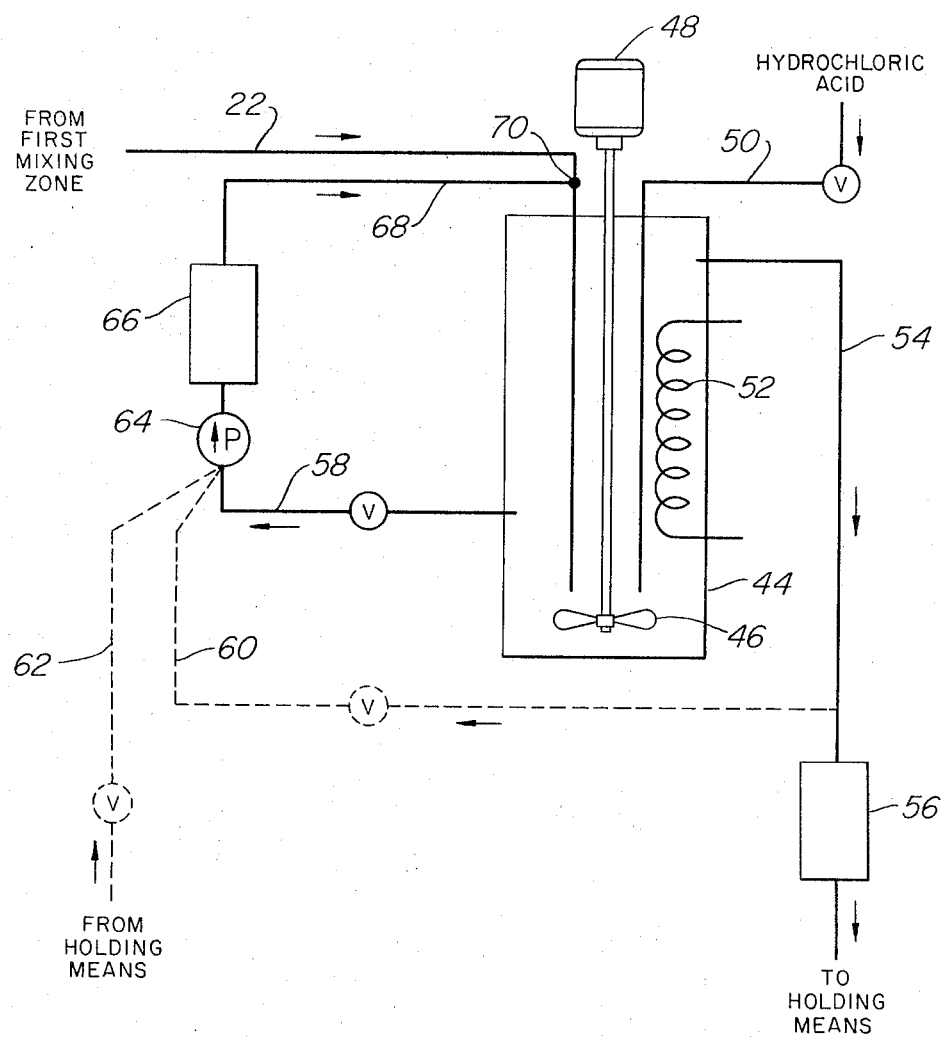
Figure 3:
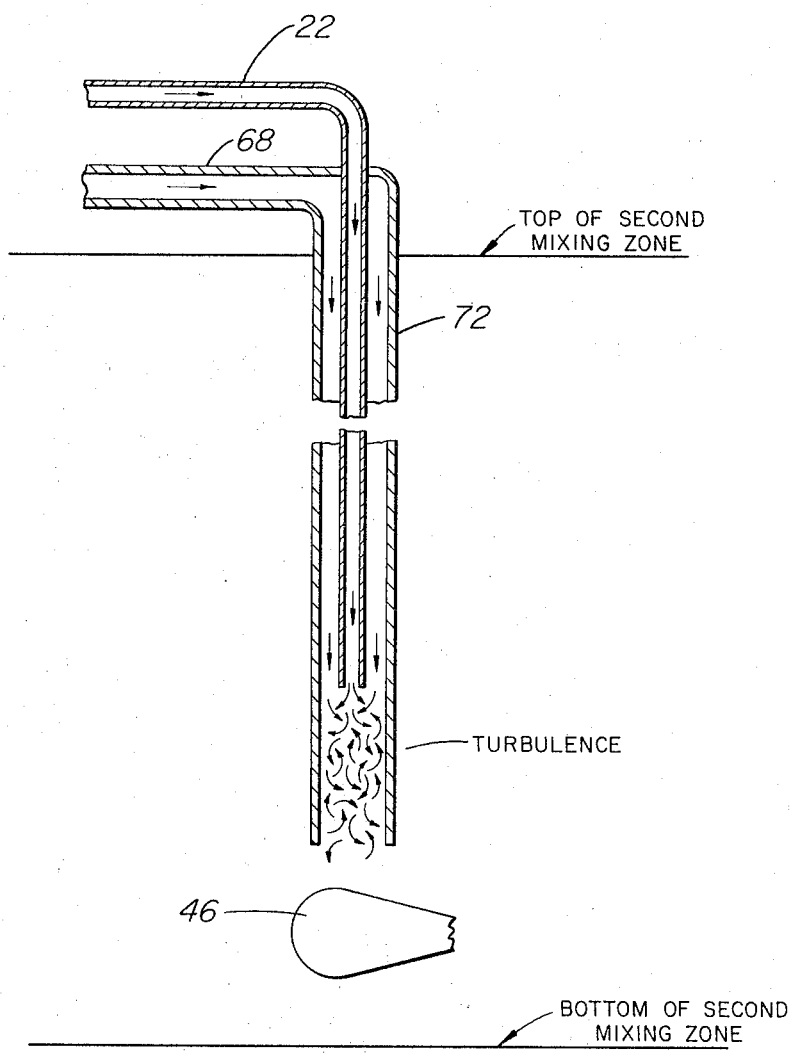
Figure 4:
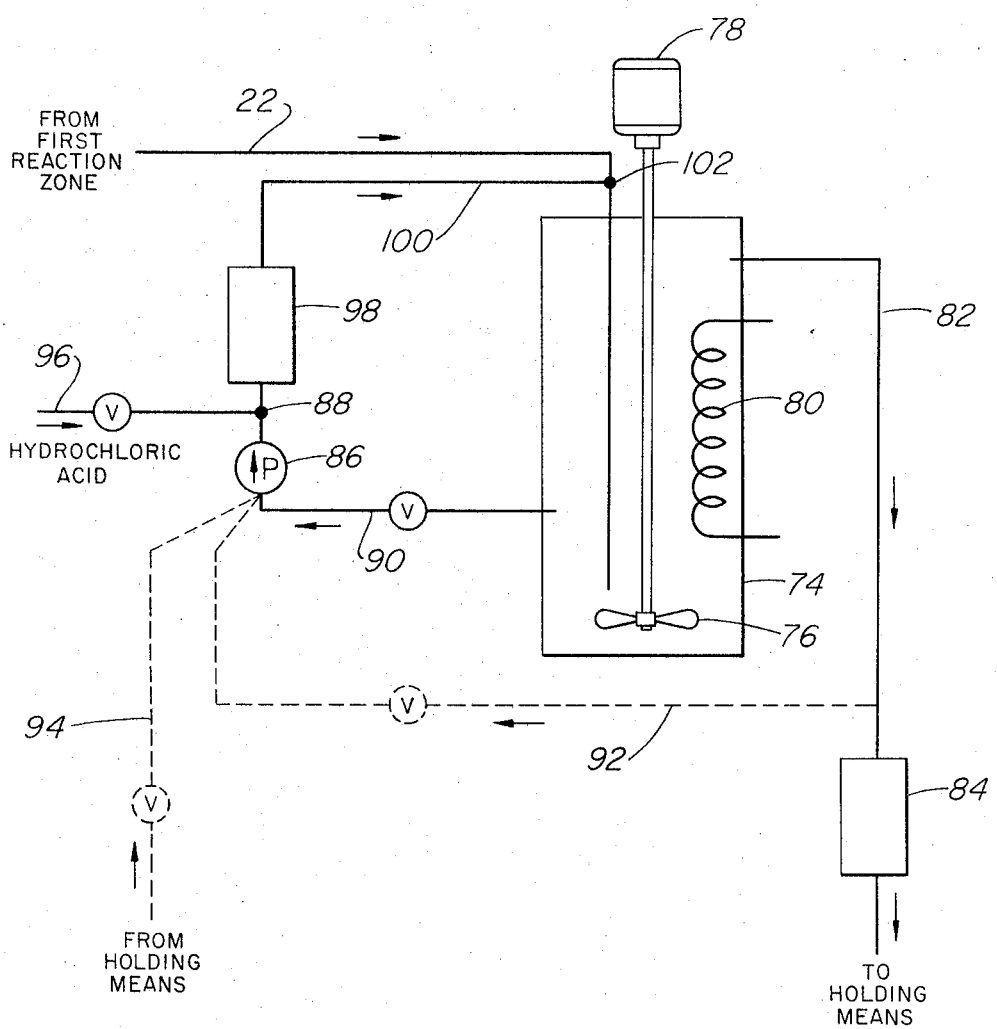

Reference should now be made to the accompanying drawings. FIG. 1 shows stream flow through apparatus in accord with the novel continuous process of this invention. FIGS. 2 and 4 show stream flow through second mixing zones which include particular means for ensuring optimum temperature control. FIG. 3 shows a preferred means for mixing two streams in the apparatus shown in FIGS. 2 and 4.

In FIG. 1, item 10 represents a first mixing zone into which are passed aniline via valved line 12 and aqueous formaldehyde solution via valved line 14, each valved line advantageously terminating in one or more injection nozzles near mixing blades 16 which are powered by motor 18. Mixing zone 10 is advantageously constructed to provide an average stream residence about 30 to about 300 seconds, and is advantageously maintained within the desired temperature range with the aid of heat exchange means 20, shown as coils through which can be passed a heating or cooling fluid, for example, steam or water.

The reaction stream emerges near the top of first mixing zone 10 and passes via line 22 to a second mixing zone 24. Line 22 advantageously terminates in one or more injection nozzles near mixing blades 26 which are powered by motor 28. Hydrochloric acid is also passed into second zone 24 via valved line 30 which advantageously terminates in one or more injection nozzles near mixing blades 26. Second mixing zone 24 is advantageously constructed to provide an average stream residence at least about one minute, preferably about one to about 20 minutes, and is advantageously maintained within the desired temperature range with heat exchange means 32, shown as coils through which can be passed a heating or cooling fluid, for example, steam or water. The reaction stream emerges near the top of second mixing zone 24, and passes via line 34 and heat exchanger 36 to holding means 38.

Means 38 is shown as a single relatively large tank with heat exchange means 40, shown as coils, for maintaining the desired temperature within said tank. Holding means 38 can alternatively be a cascade of interconnected relatively small hold tanks, a continuous line, or an equivalent means for providing the necessary stream residence. Agitation within holding means 38 is usually not necessary. The final reaction stream emerges via line 42. Aniline can be added as a stream diluent to line 42 via a valved line and mixing T of conventional design. The final mixed stream then passed to the neutralizer.

In FIG. 2, items 44 through 56 replace items 24 through 36 in FIG. 1. As in FIG. 1, a stream obtained by mixing aniline and aqueous formaldehyde solution comes from a first mixing zone via line 22. In FIG. 2, line 22 enters second mixing zone 44 and terminates in one or more injection nozzles near mixing blades 46 which are powered by motor 48. Hydrochloric acid is passed into zone 44 via valved line 50 which terminates in one or more injection nozzles near mixing blades 46. Mixing zone 44 is advantageously constructed to provide an average stream residence at least about one minute, preferably about one to about 20 minutes. Heat exchange means, shown as coils 52, aids in maintaining the stream within the desired temperature range.

The stream emerges near the top of mixing zone 44 and passes via line 54 and heat exchanger 56 to a holding means shown in FIG. 1 as item 38.

When hydrochloric acid and the stream from the first mixing zone have been continuously mixed and reacted at least until the second mixing zone starts to overflow via line 54, a portion of the stream in zone 44 or at some point subsequent to zone 44 is diverted and mixed with the stream coming directly from first mixing zone 10 before the latter stream comes into contact with the main body of liquid in mixing zone 44. This diverted partial stream can be taken directly from a point in mixing zone 44, for example, via valved line 58, or, alternatively, it can be taken from line 54, for example, via valved line 60, or from any point in holding means 38 or from line 42 (see FIG. 1), for example, via valved line 62. The diverted partial stream is passed with the aid of pump 64 through heat exchanger 66 where the stream is cooled, preferably about 10° to about 30° C. below the temperature maintained within mixing zone 44. This cooled diverted stream is then passed via line 68 to a point 70 where it merges with the stream from the first mixing zone. Although merger point 70 is shown outside of zone 44, point 70 can alternatively be located inside zone 44. For reasons not completely understood, preliminary contact of the cooled diverted stream with the stream of free amines from first mixing zone 10 makes possible a faster flow through mixing zone 44, a more precise control of temperature within zone 44, and a smaller amount of undesirable resinous material in the final mixture of methylene-bridged polyphenyl polyamines.

FIG. 3 shows enlarged a preferred embodiment of merger point 70. Tube 72 is an enlarged extension of line 68 (see FIG. 2) terminating near mixing blades 46 in FIG. 2. Line 22 is inside and concentric with tube 72, terminating at a point above the end of tube 72 so that the stream in line 22 and the stream in tube 72 mix under conditions of turbulent flow, i.e., with a Reynolds number at least about 10,000, preferably in the range about 50,000 to about 500,000.

In FIG. 4, items 74 through 84 replace items 24 through 36 in FIG. 1. As in FIG. 1, a stream obtained by mixing aniline and aqueous formaldehyde solution comes from a first mixing zone via line 22. In FIG. 4, line 22 enters second mixing zone 74 and terminates in one or more injection nozzles near mixing blades 76 which are powered by motor 78. Hydrochoric acid is at first passed into zone 74 via a valved line, not shown, positioned similarly to line 30 in FIG. 1. Mixing zone 74 is advantageously constructed to provide an average stream residence at least about one minute, preferably about one to about 20 minutes. Heat exchange means, shown as coils 80, aids in maintaining the stream within the desired temperature range.

The stream emerges near the top of mixing zone 74 and passes via line 82 and heat exchanger 84 to a holding means shown in FIG. 1 as item 38.

When hydrochloric acid and the stream from the first mixing zone have been continuously mixed and reacted at least until the second mixing zone starts to overflow via line 82, a portion of the stream in zone 74 or at some point subsequent to zone 74 is diverted with the aid of pump 86 to mixing T 88. This diverted partial stream can be taken directly from a point in mixing zone 74, for example, via valved line 90, or, alternatively, it can be taken from line 82, for example, via valved line 92, or from any point in holding means 38 or from line 42 (see FIG. 1), for example, via valved line 94. At the same time, the flow of hydrochloric acid is diverted to mixing T 88 via valved line 96. The diverted partial stream and the hydrochloric acid are thus mixed at T 88. The mixed stream is then passed through heat excanger 98 where the stream is cooled, preferably about 10° to about 30° C. below the temperature maintained within mixing zone 74. Since the diverted partial stream contains some free amines, at least part of the heat released by formation of amine-HCl addition salts is also removed. The cooled mixed stream is then passed via line 100 to a point 102 where it merges with the stream from the first mixing zone. Although merger point 102 is shown outside of zone 74, point 102 can be located alternatively inside zone 74. For reasons not completely understood, this means of introducing hydrochloric acid makes possible a faster flow through mixing zone 74, a more precise control of temperature within zone 74, and a smaller amount of undesirable resinous material in the final mixture of methylene-bridged polyphenyl polyamines.

Preferably, merger point 102 is constructed as shown in FIG. 3 for the preferred embodiment of merger point 70 (FIG. 2). The same limitations with regard to Reynolds numbers are preferred for merger point 102 as for merger point 70.

The operational details of the novel continuous process of this invention will be apparent from consideration of the following examples.

EXAMPLE 1

Referring to FIG. 1, aniline at the rate 16.0 ml. per min. and 37% aqueous formaldehyde solution at the rate 7.25 ml. per min. were fed via lines 12 and 14 respectively to points close to rotating mixing blades 16 in vessel 10. In this embodiment, vessel 10 was a 600-ml. stainless steel beaker with four internal baffle plates and a side overflow tube 3 inches from the bottom and leading to line 22. At these flow rates, the beaker initially filled to the overflow tube in about 17 minutes. These flow rates correspond to an initial aniline-formaldehye molecular ratio 4.0:2.25. The exothermic reactions occurring within vessel 10 caused the temperature of the stream therein to be in the range 46° to 47.5° C.

The stream which emerged from vessel 10 by its side overflow tube was passed by gravity via line 22 to vessel 24, entering at a point close to rotating mixing blades 26. In this embodiment, vessel 24 was a 500-ml. glass flask with four internal glass baffle plates and a 163-ml. volume to the overflow tube leading to line 34. Simultaneously, 31% hydrochloric acid at the rate 10.0 ml. per minute was fed via line 30 to a point close to mixing blades 26 in vessel 24. These stream and hydrochloric acid flow rates correspond to an HCl-aniline molecular ratio 2.0:4.0 based on the amount of aniline initially present in the stream. The exothermic reactions occurring within vessel 24 caused the temperature of the stream therein to be in the range 84° to 94° C. after a steady state was attained. The streams in vessels 10 and 24 were not cooled by coils 20 or 32 but solely by heat loss through the vessel walls.

The stream which emerged from vessel 24 was passed by gravity to holding means 38 which, in this embodiment, was a 40-foot length of one-half inch I.D. polyethylene tubing coiled in a pan containing water in the range 90° to 100° C.

After steady state conditions had been attained in the continuous system, a portion of the stream which emerged from the tubing coil (at a point corresponding to line 42 in FIG. 1) was cooled to about 25° C. and neutralized with 50% aqueous sodium hydroxide. The amine layer was washed with water, dried, and freed of aniline by distillation. An analytical fractional distillation at reduced pressure before aniline removal indicated the presence of about 27.5% aniline, the remainder being about 55.0% ar,ar'-methylenedianilines, about 23.1% trimeric material, largely $\alpha,\alpha$-(aminophenylene)ditoluidines, and about 21.9% basic material of higher molecular weight.

EXAMPLE 2

Referring to FIGS. 1, 2, and 3, aniline at the rate 250 lbs. per hr. (29.3 gals. per hr.) and 37% aqueous formaldehyde solution at the rate 125 lbs. per hr. (13.5 gals. per hr.) were fed via lines 12 and 14 respectively to vessel 10. These flow rates correspond to an initial aniline-formaldehyde molecular ratio 4.0:2.3. In this embodiment, vessel 10 was a two-gallon Stratco Contactor (model No. 384, type VCS, size 6–2–5.7; manufactured by Stratford Engineering Corporation, Kansas City, Missouri). The aniline and formalin streams entered this device through two concentric center tubes which discharged at the apex of a rapidly rotating impeller. The resulting mixture was thereby circulated at the rate about 165 gals. per minute upward between the outer shell of the vessel and an inner cooling coil, between the turns of the coil, and then down between the coil and the center inlet tubes. The stream within vessel 10 was maintained in the range 81° to 83° C. by passing cold water through said cooling coil, corresponding to 20 in FIG. 1. The average residence of the stream in vessel 10 was about 160 to 180 seconds.

The stream emerged at an upper overflow point in the form of a white emulsified mixture of water, aniline, formaldehyde, and condensation products. This stream was passed via line 22 to vessel 44 (see FIG. 2). In this embodiment, vessel 44 was a covered 10-gallon glass-lined tank. Hydrochloric acid (20° Bé.) at the rate 105 lbs. per hr. (10.9 gal. per hr.) was fed via line 50 to a point close to mixing blades 46 near the bottom of the tank. The stream entering via line 22 was also fed to a point close to mixing blades 46. When the tank was full and the stream emerged from vessel 44 via line 54, a portion of the stream (about 1200 gals. per hour) was diverted via line 58 and pump 64 to heat exchanger 66 where the temperature of this portion of the stream was lowered to about 60° C. This cooled stream was then passed via line 68 and tube 72 back into vessel 44 (see FIG. 3). The stream from the first reaction zone, i.e., vessel 10, was passed down the center of tube 72 via an extension of line 22, merging with the cooled stream in the lower part of tube 72 before either stream entered the main body of the stream resident in vessel 44. In this embodiment, line 22 was one-quarter inch I.D.; tube 72 was one inch I.D. The distance from the lower end of line 22 to the lower end of tube 72 in FIG. 3 was about 10 inches. It is estimated that a turbulence corresponding to a Reynolds number about 100,000 was attained in that 10-inch space. At a steady state under these conditions and with further cooling by passing cold water through a coil corresponding to coil 52, the temperature of the stream in vessel 44 was in the range 79 to 81° C. and the average residence of the stream aws about 16 to 18 minutes. These stream and hydrochloric acid flow rates correspond to an HCl-aniline molecular ratio 1.35:4.0 based on the amount of aniline initially present in the stream.

The stream which emerged from vessel 44 via line 54 was passed through heat exchanger 56 to holding means 38 (see FIG. 1). In this embodiment, holding means 38 comprised a cascade of three insulated, covered, 55-gallon tanks with acid-resistant linings. Heat exchanger 56 raised the temperature of the stream to the range 88° to 93° C. The stream flowed to the bottom of the first tank, overflowing to the bottom of the second tank and then to the bottom of the third tank. The temperature of the stream resident within the tanks was maintained in the range 85° to 95° C. The average stream residence in this holding means was about 2 hours.

The stream which emerged from the second mixing zone, i.e., vessel 44, was in the form of a mobile orange slurry. By the time the stream had reached the end of the holding means, i.e., item 38, it was in the form of a clear dark orange solution.

After emerging from the top of the third tank of holding means 38 via line 42, the stream was cooled by a heat exchanger of conventional design to the range 71° to 77° C. Aqueous 50% sodium hydroxide solution was then added to the stream with cooling so that a stream in the pH range 9 to 10 and a stream temperature in the range 75° to 85° C. were obtained. The resulting two-phase stream was then passed through a series of continuous brine separators, water washers, vacuum strippers, and nitrogen strippers, all of conventional design, in which brine, water, and aniline were separated from the final mixture of methylene-bridged polyphenyl polyamines. This final product was a brown liquid containing about 45.2% ar,ar'-methylenedianilines, about 23.8% trimeric material, and about 31.0% material of higher molecular weight; viscosity 990 centistokes at 70° C.

EXAMPLE 3

Following the procedure and using the apparatus of Example 2, aniline at the rate 250 lbs. per hr. (29.3 gals. per hr.), 37% aqueous formaldehyde solution at the rate 87.2 lbs. per hr. (9.5 gals. per hr.), and 20° Bé. hydrochloric acid at the rate 160 lbs. per hr. (16.6 gals. per hr.) were interacted to produce a mixture of methylene-bridged polyphenyl polyamines containing about 65% ar,ar'-methylenedianilines on an aniline-free basis. The above proportions of stream reactants correspond to an aniline-formaldehyde-HCl molecular ratio 4.0:1.6:2.1. A first zone temperature 79° to 81° C., a second zone temperature 76° to 78° C., and a holding zone temperature 89° to 91° C. were used.

EXAMPLE 4

Following the procedure and using the apparatus of Examples 2 and 3, aniline, 37% aqueous formaldehyde solution, and 20° Bé. hydrochloric acid were interacted in an aniline-formaldehyde-HCl molecular ratio 4.0:2.3:1.8. A first zone temperature 97° to 99° C., a second zone temperature 79° to 81° C., and a holding zone temperature 90° to 93° C. were used. The final aniline-free product was a brown liquid containing about 45% ar,ar'-methylenedianilines, the remainder being trimeric material and material of higher molecular weight; viscosity 830 centistokes at 70° C.

EXAMPLE 5

Following the procedure and using the apparatus of Examples 2 and 3, aniline, 37% aqueous formaldehyde solution, and 20° Bé. hydrochloric acid were interacted in an aniline-formaldehyde-HCl molecular ratio 4.0:1.85:2.0. A first zone temperature 81° to 83° C., a second zone temperature 79° to 81° C., and a holding zone temperature 90° to 93° C. were used. The final aniline-free product was a brown liquid containing about 63% ar,ar'-methylenedianilines, the remainder being trimeric material and material of higher molecular weight; viscosity 200 centistokes at 70° C.

EXAMPLE 6

Referring to FIGS. 1, 3, and 4, aniline at the rate 650 lbs. per hour and 37% aqueous formaldehyde solution at the rate 291 lbs. per hour were combined into a reaction stream by the procedure and with the vessel 10 apparatus described in Example 2. The average residence of the stream in vessel 10 was 60 to 70 seconds. The temperature in vessel 10 was 79° to 81° C. These flow rates correspond to an initial aniline-formaldehyde molecular ratio 4.0:2.05.

The stream emerged at an upper overflow point in the form of a white emulsified mixture of water, aniline, formaldehyde and condensation products, and was passed via line 22 to a point close to mixing blades 76 in vessel 74 (see FIG. 4). In this embodiment, vessel 74 was a closed 10-gallon cylindrical glass reactor. Hydrochloric acid (20° Bé.) at the rate 425 lbs. per hour was passed into vessel 74 by a line positioned as is line 30 in FIG. 1. When the stream in vessel 74 began to overflow through line 82, the hydrochloric acid stream was gradually diverted to line 96. At the same time, part of the stream in vessel 74 was diverted via line 90 to mixing T 88 where this portion of the stream was mixed with the hydrochloric acid stream. The mixed stream was cooled by passing through heat exchanger 98, and was then passed via line 100 to a point where the mixed stream merged with the stream from the first reaction zone (vessel 10). This merger point is shown as item 102 in FIG. 4 but the actual zone was the same as shown in FIG. 3 and as explained in Example 2.

The flow rate of hydrochloric acid through line 96 was gradually increased to the final rate 425 lbs. per hour, being mixed at T 88 with about 27,000 lbs. per hour of stream from vessel 74. These flow rates of hydrochloric acid and stream from vessel 10 correspond to an HCl-aniline molecular ratio about 2.0:4.0. The temperature of the stream emerging from heat exchanger 98 was maintained in the range 50° to 60° C. At steady state conditions, the temperature of the stream in vessel 74 was maintained in the range 72° to 75° C. with the further air of cooling coils 80.

The stream which emerged from vessel 74 via line 82 was passed through heat exchanger 84 to holding means 38 (see FIG. 1). In this embodiment, holding means 38 comprised a cascade of six insulated, covered, 55-gallon tanks with acid-resistant linings. Heat exchanger 84 raised the temperature of the stream to the range 89° to 91° C. The stream flowed to the bottom of the first tank, overflowing to the bottom of the second tank and then on to the bottom of each successive tank in the cascade. The temperature of the stream resident within the tanks was maintained in the range 85° to 95° C. during the 2-hour residence.

The desired mixture of methylene-bridged polyphenyl polyamines was isolated from the final stream as described in Example 2. The final stream contained about 21.5% aniline. The final aniline-free polyamine mixture contained about 53% ar,ar'-methylenedianilines, the remainder being trimeric material and material of higher molecular weight; viscosity 290 centistokes at 70° C.

In an otherwise identical continuous run, additional aniline was mixed with the stream emerging via line 42 from holding means 40 at the rate about 0.6 gal. per gallon of stream to reduce the stream viscosity and facilitate continuous separation of the desired product. The final polyamine product had essentially the same composition and viscosity but the throughput of stream through the neutralization, isolation, and purification stages was smoother and faster than when addition of aniline at this point was omitted.

EXAMPLE 7

Following the procedure and using the apparatus of Example 6, aniline at the rate 250 lbs. per hour (29.3 gals. per hr.), 37% aqueous formaldehyde solution at the rate 117 lbs. per hr. (12.7 gals. per hr.), and 20° Bé. hydrochloric acid at the rate 155 lbs. per hr. (16.05 gals. per hr.) were interacted. These flow rates correspond to an aniline-formaldehyde-HCl molecular ratio 4.0:2.15:2.0. A first zone temperature 80° to 83° C., a second zone temperature 77° to 79° C., and a holding zone temperature 90° to 92° C. were used. The final aniline-free product was a brown liquid containing about 50% ar,ar'-methylenedianilines, the remainder being trimeric material and material of higher molecular weight; viscosity 370 centistokes at 70° C.

We claim:

1. A continuous process for producing a mixture of methylene-bridged polyphenyl polyamines which comprises the steps, (1) continuously passing aniline and aqueous formaldehyde solution in an aniline-formaldehyde molecular ratio about 4:1 to about 4:2.5 into a first mixing zone maintained in the range 40° to 100° C. (2) continuously passing the stream emerging from said first mixing zone into a second mixing zone maintained in the range about 70° to about 100° C., and there continuously mixing said stream with at least enough hydrochloric acid to provide an HCl-aniline molecular ratio about 1:4 based on the amount of aniline initially present in the stream, (3) maintaining the stream emerging from said second mixing zone in the range 50° to 100° C. until a substantial amount of a mixture of methylene-bridged polyphenyl polyamines has formed, and (4) recovering said mixture of methylene-bridged polyphenyl polyamines.

2. The process of claim 1 wherein the average residence of the stream in the first mixing zone is at least one-half minute.

3. The process of claim 1 wherein the average residence of the stream in the first mixing zone is one-half to five minutes.

4. The process of claim 1 wherein the concentration of the hydrochloric acid added to the second mixing zone is at least 16° Bé.

5. The process of claim 1 wherein a portion of the stream after mixing with hydrochloric acid is continuously diverted, cooled below the temperature maintained within the second mixing zone, and mixed with the stream from the first mixing zone before the latter stream becomes part of the stream resident in the second mixing zone.

6. The process of claim 5 wherein said stream from the first mixing zone and the diverted stream are mixed under conditions of turbulent flow.

7. The process of claim 1 wherein a portion of the stream after mixing with hydrochloric acid is continuously diverted, mixed with additional hydrochloric acid, cooled to at least the temperature maintained within the second mixing zone, and added to the second mixing zone.

8. The process of claim 7 wherein the mixture of hydrochloric acid and diverted stream is mixed with the stream from the first mixing zone before the latter stream becomes part of the stream resident in the second mixing zone.

9. The process of claim 8 wherein said mixture of hydrochloric acid and diverted stream is mixed with said stream from the first mixing zone under conditions of turbulent flow.

No references cited.

CHARLES B. PARKER, *Primary Examiner.*

R. V. HINES, *Assistant Examiner.*